US012664221B2

(12) United States Patent
Malakuti et al.

(10) Patent No.: US 12,664,221 B2
(45) Date of Patent: Jun. 23, 2026

(54) NEGOTIATION OF INFORMATION CONTRACTS BETWEEN INFORMATION PROVIDERS AND CONSUMERS

(71) Applicant: ABB Schweiz AG, Baden (CH)

(72) Inventors: Somayeh Malakuti, Dossenheim (DE); Dirk Schulz, Meckenheim (DE); Johannes Schmitt, Ladenburg (DE); Sten Gruener, Laudenbach (DE); Ralf Gitzel, Mannheim (DE); Prerna Juhlin, Heidelberg (DE)

(73) Assignee: ABB Schweiz AG, Baden (CH)

( * ) Notice: Subject to any disclaimer, the term of this patent is extended or adjusted under 35 U.S.C. 154(b) by 410 days.

(21) Appl. No.: 17/502,893

(22) Filed: Oct. 15, 2021

(65) Prior Publication Data

US 2022/0121716 A1    Apr. 21, 2022

(30) Foreign Application Priority Data

Oct. 16, 2020    (EP) ...................................... 20202363

(51) Int. Cl.
*G06F 16/953*        (2019.01)
*G06F 16/955*        (2019.01)
*H04L 67/1097*       (2022.01)

(52) U.S. Cl.
CPC .......... *G06F 16/953* (2019.01); *G06F 16/955* (2019.01); *H04L 67/1097* (2013.01)

(58) Field of Classification Search
CPC ... G06F 16/953; G06F 16/955; H04L 67/1097
See application file for complete search history.

(56) References Cited

U.S. PATENT DOCUMENTS

| | | | | | |
|---|---|---|---|---|---|
| 6,711,563 B1 * | 3/2004 | Koskas | ................. | G06F 16/284 |
| | | | | 707/769 |
| 7,490,073 B1 * | 2/2009 | Qureshi | ................. | G06N 5/048 |
| | | | | 706/56 |

(Continued)

FOREIGN PATENT DOCUMENTS

| | | | | | |
|---|---|---|---|---|---|
| CN | 102456100 B | * | 12/2016 | | |
| CN | 109726292 A | * | 5/2019 | | |
| EP | 3985528 A1 | * | 4/2022 | ........... | G06F 16/955 |

OTHER PUBLICATIONS

European Search Report and Written Opinion for European Patent Application No. EP20202363.6, dated Mar. 25, 2021, 8 pages.

(Continued)

*Primary Examiner* — Mark E Hershley
(74) *Attorney, Agent, or Firm* — McCarter & English, LLP; Michael M. Gnibus; Benjamin A. Ailes

(57)        ABSTRACT

A method for automatically supplying or locating data over a communication network comprising: configuring a data source to provide source data over the communication network, the source data being identified by a data identifier in a domain of identifiers; receiving a machine-readable description, the machine-readable description specifying at least one predicate that must be satisfied by the data; labeling data identified by the data identifier with labels at least in part indicative of data predicates that hold true for the data identified by the data identifier or that are satisfiable for the data identified by the data identifier; searching for the data based at least in part on the machine-readable description and the labels; obtaining a solution satisfying the predicate based on the search; and supplying the solution over the communication network to a data consumer.

10 Claims, 3 Drawing Sheets

(56)                References Cited

U.S. PATENT DOCUMENTS

| | | | | |
|---|---|---|---|---|
| 8,694,488 B1* | 4/2014 | Garg | G06F 16/3322 | |
| | | | | 707/768 |
| 10,880,322 B1* | 12/2020 | Jakobsson | H04L 51/08 | |
| 2006/0212429 A1* | 9/2006 | Bruno | G06F 16/24578 | |
| 2007/0150525 A1* | 6/2007 | Idicula | G06F 16/1873 | |
| | | | | 707/999.203 |
| 2010/0070448 A1* | 3/2010 | Omoigui | H10F 39/1825 | |
| | | | | 706/55 |
| 2011/0252073 A1* | 10/2011 | Pauly | G06F 16/213 | |
| | | | | 707/812 |
| 2012/0096054 A1* | 4/2012 | Egan | G06F 16/24561 | |
| | | | | 707/E17.049 |
| 2012/0110016 A1* | 5/2012 | Phillips | G16Z 99/00 | |
| | | | | 707/E17.014 |
| 2012/0284012 A1* | 11/2012 | Rodriguez | G06F 3/017 | |
| | | | | 455/556.1 |
| 2013/0282650 A1* | 10/2013 | Zhang | G06F 16/283 | |
| | | | | 707/E17.056 |
| 2014/0052743 A1* | 2/2014 | Schauer | G06F 16/2455 | |
| | | | | 707/754 |
| 2014/0282586 A1* | 9/2014 | Shear | G06F 9/5072 | |
| | | | | 718/104 |
| 2015/0339158 A1* | 11/2015 | Harris | G06F 9/48 | |
| | | | | 718/103 |
| 2016/0034305 A1* | 2/2016 | Shear | G06F 9/50 | |
| | | | | 707/722 |
| 2017/0286456 A1* | 10/2017 | Wenzel | G16H 10/20 | |
| 2019/0147085 A1* | 5/2019 | Pal | G06F 16/24542 | |
| | | | | 707/718 |
| 2020/0210869 A1* | 7/2020 | Anicic | G06F 16/289 | |
| 2021/0389946 A1* | 12/2021 | Wilkerson | G06F 9/5044 | |
| 2021/0405624 A1* | 12/2021 | Schiekofer | G06F 16/88 | |
| 2022/0121716 A1* | 4/2022 | Malakuti | G06F 16/90335 | |
| 2022/0318059 A1* | 10/2022 | Cook | G06F 9/5038 | |
| 2023/0082446 A1* | 3/2023 | Zilio | G06F 16/24561 | |
| | | | | 707/769 |

OTHER PUBLICATIONS

Martin Bauer et al: "The Context API in the OMA Next Generation Service Interface", Intelligence in Next Generation Networks (ICIN), 2010 14th International Conference on, IEEE, Piscataway, NJ, USA, Oct. 11, 2010 (Oct. 11, 2010), pp. 1-5.

Ked Charbel El et al: "FOrTE: A Federated Ontology and Timeseries Query Engine", 2017 IEEE International Conference on Internet of Things (Ithings) and IEEE Green Computing and Communications (Greencom) and IEEE Cyber, Physical and Social Computing (CPSCOM) and IEEE Smart Data (Smartdata), IEEE, Jun. 21, 2017, pp. 983-990.

* cited by examiner

Figure 3:
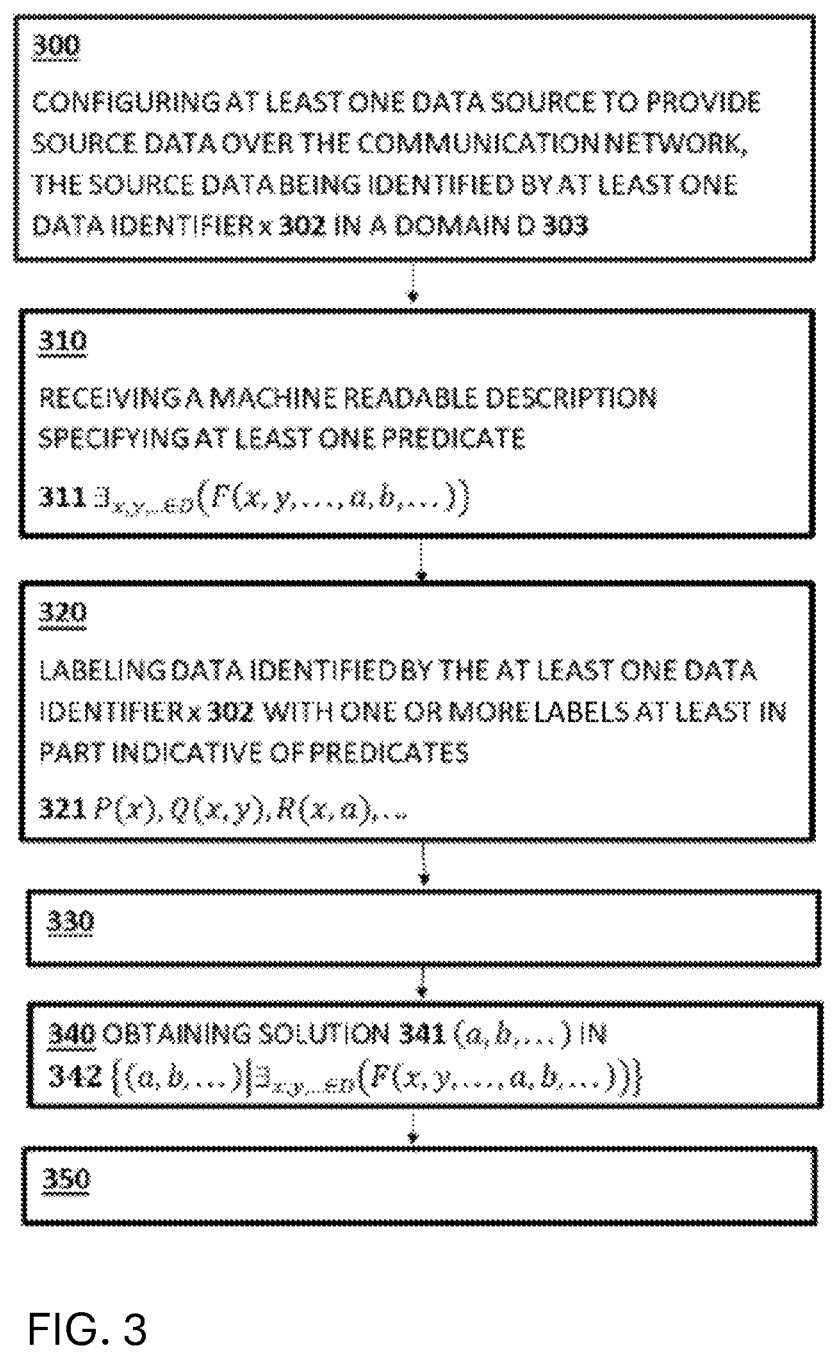

300

CONFIGURING AT LEAST ONE DATA SOURCE TO PROVIDE SOURCE DATA OVER THE COMMUNICATION NETWORK, THE SOURCE DATA BEING IDENTIFIED BY AT LEAST ONE DATA IDENTIFIER x 302 IN A DOMAIN D 303

310

RECEIVING A MACHINE READABLE DESCRIPTION SPECIFYING AT LEAST ONE PREDICATE

311 $\exists_{x,y,\ldots \in D}\big(F(x,y,\ldots,a,b,\ldots)\big)$

320

LABELING DATA IDENTIFIED BY THE AT LEAST ONE DATA IDENTIFIER x 302 WITH ONE OR MORE LABELS AT LEAST IN PART INDICATIVE OF PREDICATES

321 $P(x), Q(x,y), R(x,a),\ldots$

330

340 OBTAINING SOLUTION 341 $(a,b,\ldots)$ IN
342 $\{(a,b,\ldots)|\exists_{x,y,\ldots \in D}\big(F(x,y,\ldots,a,b,\ldots)\big)\}$

NEGOTIATION OF INFORMATION CONTRACTS BETWEEN INFORMATION PROVIDERS AND CONSUMERS

CROSS-REFERENCE TO RELATED APPLICATIONS

This application claims priority to European Patent Application No. 20202363.6, filed on Oct. 16, 2020, and titled "Negotiation of Information Contracts between Information Providers and Consumers", the disclosure of which is incorporated herein in its entirety.

FIELD

Embodiments of the present disclosure relate generally to methods and systems for automatically supplying or locating data over a communication network.

BACKGROUND

Present automation system are typically distributed computing system where a plurality of data providers interact with a plurality of data consumers and/or vice versa.

For example, data from a plurality of sensors of different devices may be stored in a distributed memory, e.g. in different memories for different sensors and/or devices, and may be accessed by a plurality of data consumers e.g. in a control loop and/or for performance analysis and/or for monitoring and/or fault detection and/or data analysis and for a plurality of additional tasks.

Traditionally the location and/or the meaning, i.e. the semantic information, of the data must be known in order to correctly interpret and use the data.

But the complexity of the distributed system makes it often impossible to keep an overview of the different data stored across the system, keeping an overview of the meaning of each data content at the different locations.

Moreover, finding data satisfying a predefined requirement can be impossible due to the complexity of the system.

A plurality of protocols, languages, models can even more hinder the task of finding data satisfying the predefined requirement, for example when data is labeled with different semantic tags with substantially the same meaning.

SUMMARY

One embodiment of the present disclosure discloses a method for automatically supplying or locating data (341) over a communication network, the method comprising:

configuring (300) at least one data source to provide source data over the communication network, the source data being identified by at least one data identifier (302) in a domain (303) of identifiers;

receiving (310) a machine-readable description, the machine-readable description specifying at least one predicate (311) that must be satisfied by the data;

labeling (320) data identified by the at least one data identifier (302) with one or more labels at least in part indicative of data predicates (321) that hold true for the data identified by the at least one data identifier (302) or that are satisfiable for the data identified by the at least one data identifier (302);

searching (330) for the data based at least in part on the machine-readable description and the labels;

obtaining (340) at least one solution (341) satisfying the at least one predicate (311) based on the search; and supplying (350) the at least one solution (341) over the communication network to a data consumer.

Another embodiment of the present disclosure discloses a system for automatically supplying or locating data over a communication network, the system comprising:

at least one data source configured to provide source data over the communication network, the source data being identified by at least one data identifier (302) in a domain (303) of identifiers.

a first subsystem configured to receive a machine-readable description, the machine-readable description specifying at least one predicate that must be satisfied by the data;

a second subsystem configured to label the data identified by the at least one data identifier x with one or more labels at least in part indicative of data predicates that hold true for the data identified by the at least one data identifier x or that are satisfiable for the data identified by the at least one data identifier;

a third subsystem configured to search for the data based at least in part on the machine-readable description and the labels;

a fourth subsystem configured to obtain at least one solution satisfying the at least one predicate based on the search;

the system being configured to supply the at least one solution over the communication network to a data consumer.

BRIEF DESCRIPTION OF DRAWINGS

FIG. 3 illustrates some details of a method for automatically supplying or locating data over a communication network.

DETAILED DESCRIPTION OF EMBODIMENTS

Figure 1:
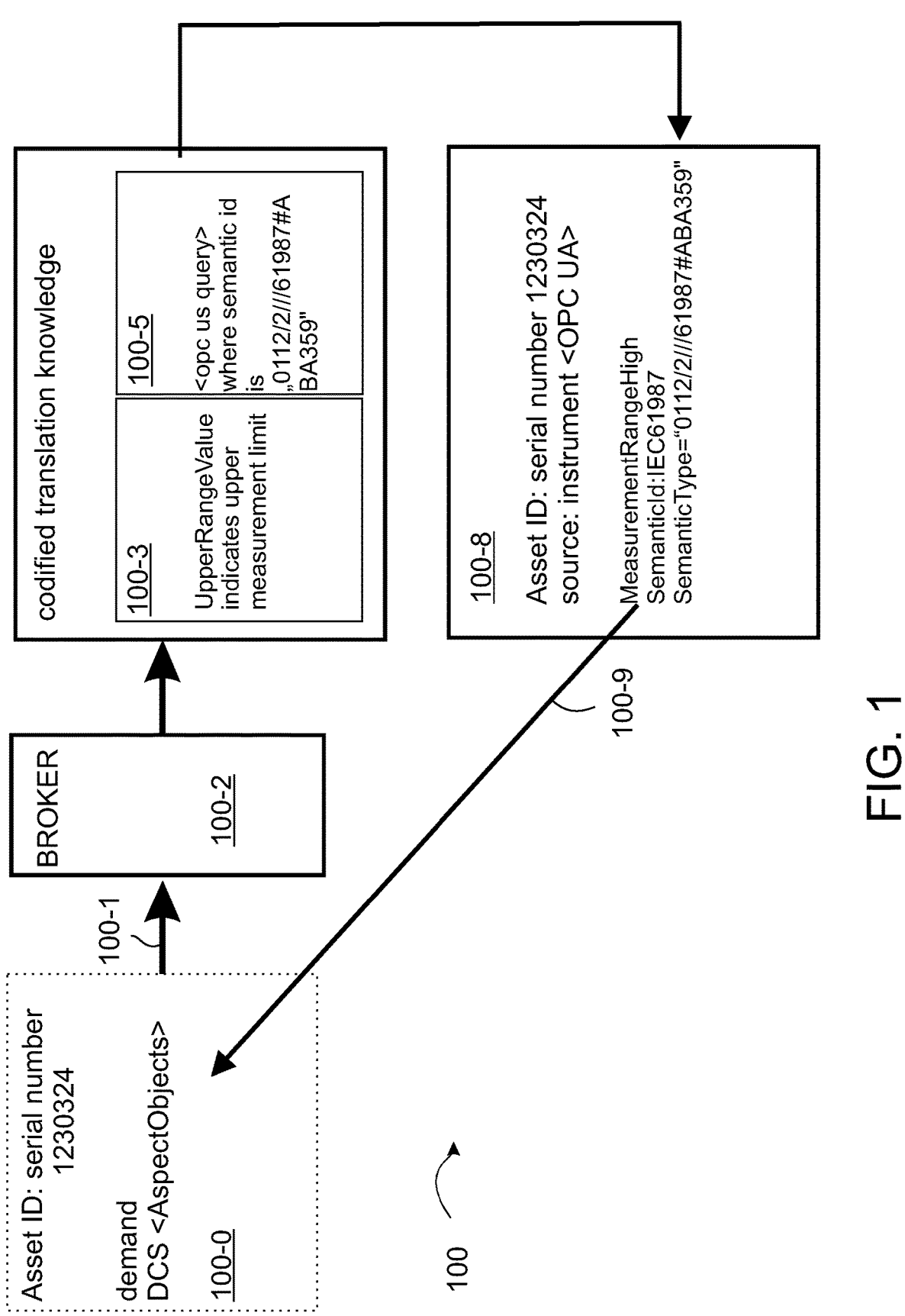
FIG. 1 shows an example of an application of a method for automatically supplying or locating data over a communication network according to the present disclosure.

A system is a portion of the physical universe that can be described by a set of quantities forming the state of the system. For example, a system formed by a set of material points may be described by the positions and velocities of each of the material points. For example, an electric circuit may be described by the voltages at the circuit nodes and/or the currents flowing between adjacent nodes of the circuit.

Typically, a set of equations describes the evolution of the sate of the system over time, given the initial conditions and the interactions between the system and the rest of the universe, e.g. given a set of input quantities describing the influence of the universe on the system. The equations are determined in function of the characteristics of the system.

In technical applications, an abstract description of a system is typically used capturing only the relevant quantities. For example, a digital circuit may be described in terms of Boolean vectors instead of considering the voltages of the circuit nodes and/or the currents of the circuit edges.

More generally, an abstract functional specification may describe the behavior of the system and/or the system state when interacting with the rest of the universe.

For example, an actuator like e.g. a robot may be described in terms of actions performed in response to given inputs that may modify a high-level abstract state of the actuator. For example, sensors may be characterized by the identification of output quantities and time instants related to unknown input quantities that needs to be determined, i.e. measured.

Information as used herein allows to determine at least in part a state of a system or a description of a system or an input given to a system or an output obtained from a system, the system being any identifiable portion of the physical world.

Information therefore allows the resolution of uncertainty about a physical system.

Typically, information about a system is itself encoded and represented with the use of another information processing or storing system, like for example a digital computer or a digital memory and/or an interconnection of digital computers and memories forming a distributed computing system.

For example, a computer may read out sensor measurements about the state of a system and store a digital representation of the measurement results in a digital memory of the computer.

A computer may also compute or predict or monitor state changes of a system.

The representation of the information, for example in terms of a sequence of binary digits forms data that characterizes the information.

Digital data is merely a sequence of binary digits that may be conveniently structured/formatted, typically stored in a physical memory of a computer or of a computing system. It is therefore necessary to keep track of the relation between the digital data and the information represented by the digital data.

Data can be written (writing operation) to a digital memory and read (reading operation) from the digital memory in a specific memory location and/or in a range or sequence of memory locations e.g. in dependence of the structure of the data and/or the type of the data, etc.

It is intended that the data is identified with the memory location(s)/address(es) where the data is stored in the sense that the data is given by the actual content at said memory location(s)/address(es). Knowing which data is stored in which memory location is therefore necessary in order to correctly assess the semantic meaning of the data itself. The memory location may be conveniently identified by a variable, an uniform resource identifier, a path, etc. such that typically there is no need to remember a low-level physical memory address. The memory may be a memory of a single machine or a distributed memory formed by a plurality of memories of a plurality of machines that may be located at different locations in space and that may communicate for example over a network. The memory may be also part of a cloud computing system.

The information stored by digital data therefore typically corresponds to the content of predefined memory locations as conveniently identified by a given variable, path etc. for data of a given type.

For example, a sequence of measurements about a system may be described by data stored in a vector or in an array in a digital memory, the vector or array being itself identified by a memory location in the local or distributed memory as for example described by a variable or a pointer that identify the vector.

A memory location may therefore be associated with a variable or a path that conveniently identifies the memory location. A plurality of variables in a path can be packaged in a namespace that globally uniquely specifies said variables and paths.

Furthermore, a hierarchical memory structure may be used, where hierarchical interconnected nodes store data and pointers to further nodes storing further data, thereby forming a graph structure.

The nodes may for example be identified with data sources storing a plurality of data with different semantic meaning. A data source/node may be identified by a unique data identifier/node identifier.

The data identifier may identify a target device storing the data together with one or more memory addresses of a memory of the target device where the data is actually stored.

A data identifier may directly or indirectly identify the data and/or the data source, for example in terms of a namespace uniform resource identifier (URI) together with a local identifier, i.e. an identifier within the namespace, and an identifier type.

The namespace uniform resource identifier may identify a namespace wherein the local identifier is defined. The namespace uniform resource identifier (URI) may for example identify a local server, an underlying system, standard bodies and consortia and may be translated into a namespace index used by a server. Once the namespace and/or the namespace index is obtained based on the namespace uniform resource identifier, a local identifier within the namespace and an identifier type uniquely identifies stored data, i.e. the namespace URI together with the local identifier and the identifier type allow to uniquely determine a target machine and one or more memory addresses where the data is stored. It is then possible to uniquely access the data for reading and writing operations, i.e. to read the data from a (uniquely identified) memory location and write data into the (uniquely identified) memory location.

The data type may identify a size of the data and/or offsets for uniquely determining and accessing stored data relative to a base address identified by the local identifier, whereas the namespace URI identifies a machine and/or data source within a network. The data type may further identify a set of operations defined on the data that allow to modify the data stored in the memory and/or that allow data processing.

A node identifier can therefore be associated with a namespace URI and/or namespace index, an identifier type and an identifier that uniquely identify the data allowing to uniquely determine the machine storing the data and the memory location(s) where the data is stored on the machine for accessing the data for reading and writing operations. The data type further specifying operations that can be performed on the data.

Data can therefore be found traversing the hierarchical memory structure.

A given location in the hierarchical memory structure may then be identified with a path in the graph formed by the interconnected nodes together with a local data identifier, with the nodes in the path being identified by a unique node identifier/data identifier.

In an object-oriented representation, data objects identified by data variables may be used to identify data and properties stored in a node of the graph structure forming the hierarchical memory. The data object therefore identifies a node in the graph structure.

A data object may include references to child objects, i.e. to child nodes in the hierarchical graph structure that themselves may store further data and properties. Properties are typically associated with leaf nodes of the graph, i.e. with nodes storing terminal data with no children nodes.

The stored data therefore represents information and it is necessary to remember an association about the physically stored data and the represented information.

For example, a vector or an array stored in a node of the hierarchical graph may store a sequence of measured values of a physical quantity. It is therefore necessary to associate the values stored in the vector/array with said physical quantity and further with e.g. a measurement unit and/or with time instants identifying measurement instants, etc.

The stored data may satisfy one or more properties and/or one or more relations between the stored data and other stored data and/or between the stored data and the information that the stored data represents or other more general information.

Moreover, a function may receive stored data as input and return transformed or filtered data as output.

Semantic information provides information about the meaning of the stored data, i.e. allows to relate the stored data to the information represented by the stored data. For example, a set of predicates that hold true for the stored data may provide semantical information about the data. Based on predicates in the set of predicates a truth value of more complex propositions about the data can be determined and therefore more complex semantic information can be obtained/evaluated based for example on atomic predicates in the set of predicates.

Present automation systems are characterized by a high complexity. An automation system is typically a distributed system with many entities communicating with each other. The communication may be a parallel communication between a plurality of entities at the same time.

In an automation system we may generally identify data providers, like e.g. sensors and/or field devices and data consumers like for example systems accessing data for e.g. data analysis and/or monitoring and/or system optimization.

A communication between data provider and data consumer and/or vice versa must therefore take place, for example over a communication network.

For example, the data consumer may be configured to request data from one or more data providers and based on said request the data provider may be configured to send the data to the data consumer.

Typically, a data provider writes data at some memory locations and the data consumer reads said data, knowing directly or indirectly said memory locations and the type/ format of the data content.

A data request may be formulated as a query in a formal machine-readable language, wherein the request identifies directly or indirectly a set of data providers and/or a set of data and/or a set of data identifiers or data locations representing or storing desired/needed information. The data request may further ask for transformations on the data, producing e.g. a transformed output in a convenient format.

The query may for example be formulated in terms of atomic predicates about data sources and/or data locations/ identifiers.

An atomic predicate may be a predicate for a namespace and/or local identifier and/or identifier type that uniquely identify stored data.

A predicate $P(x)$ associates a truth value, i.e. either the value "true" or the value "false" to an object x over a given domain D.

The domain D may include namespaces, local identifiers, identifier types, node identifiers, paths and any combination thereof for example in from of ordered tuples and/or uniform resource identifiers. An element in D therefore uniquely addresses/identifies stored data and a dereferencing operation on an element in the domain D uniquely retrieves the data. An element in D therefore is not the stored data itself but uniquely allows to address, find and retrieve the stored data.

In an object-oriented approach and/or in an information model, elements in the domain D may identify single objects/information models as well as single variables/members. Elements of the domain D may be discovered/addressed hierarchically, for example when elements are addressed with a path in a graph or tree structure.

More generally the domain D may contain any type of identifier and/or address and/or URI that may be used to at least in part locate data, e.g. in a distributed system. We may therefore call the domain D a domain of identifiers/locators.

For an object $x \in D$, the truth value $P(x)$ is fixed and if $P(x)$=true the property P holds for x and P is satisfied in x. A predicate P is meaningful for x in D, if and only if the truth value of P can be evaluated for x. Otherwise P may be undefined for x and in such a case an exception may be thrown. Depending on the type of x therefore, predicates about data locations and/or data identifiers and/or paths and/or namespaces can be made. More generally when x fully identifies a memory location, for example a memory location storing an object of a given type in a distributed memory of a distributed system, predicates about the content of the stored object become meaningful, for example predicates like $P(x)$:="x stores a vector of temperature measurements". The object stored at x itself may be labeled by a representation of the atomic predicates, i.e. predicates that are not formed using logic connectives, that hold true for x and/or that are satisfiable for x. For example, x and/or the content of x may be labeled by a (representation of a) unary predicate P if and only if $P(x)$ is true. For example, x and/or the content of x may be labeled by a (representation of a) binary predicate Q if and only if $P(x,a)$ is satisfiable for x, i.e. if there exists an a such that $P(x,a)$ holds true. From these atomic predicates even more predicates can be deduced and/or equivalent predicates may be expressed in a plurality of formats that need to be parsed and correctly recognized.

Accessing elements in D may require accessing a memory location, e.g. a distributed memory location over a network.

Embodiments of the present disclosure allow to efficiently find elements in D satisfying given requirements and/or allow to extract information from data stored e.g. in the distributed memory thereby reducing the overall memory accesses and/or the iterations over D.

Embodiments of the present disclosure therefore allow in particular to reduce network traffic and/or the time needed to find and retrieve needed information accessed e.g. dereferencing elements in the domain D stored in the distributed memory over the network.

The object x itself may be implemented in order to contain/point to metadata/semantic data related to semantic information about the object x. The object x may therefore contain further data or point to further data allowing to obtain information about the meaning, i.e. semantic information associated with the object x. In this way it may be possible to automatically evaluate if a given predicate $P(x)$ is true for an object $x \in D$. A set of rules may help in finding/identifying/deducing other predicates that hold true when P is true, e.g. predicates that are equivalent to P.

The predicates that are true for x in D or satisfiable for a given x in D may be stored within an information model, for example an OPC unified architecture (OPC UA) information model.

For example, for an information model represented as:

```
<Namespaces>
    <Namepsace Name="sensors" Prefix= (...)
</Namespaces>
(...)
    <Object SymbolicName="SENSORS:Temperature"
TypeDefinition="SENSORS:TemperatureSensorType">
        <Property SymbolicName="SENSORS:UpperLimit"
DataType="ua:UInt32" AccessLevel="Read">
            <DefaultValue>
                <uax:UInt32>256</Iax:UInt32>
            </DefaultValue>
            </Property>
        </Object>
```

The location x (element of D) may be formed by the namespace together with the symbolic name of the sensor.

A predicate that holds true for x may be "x stores temperature data", given the presence of the label TypeDefinition="SENSORS: TemperatureSensorType.

Another predicate may be for example $P(x):=$"the upper limit of the data stored at x is 256" following the presence of the property UpperLimit in the information model for the considered temperature sensor.

According to the present disclosure $P(x)$ may be expressed in a plurality of equivalent representations. For example the dependence on x may be implicitly considered.

Likely equivalences between predicates may be deduced, e.g. based on the presence of strings considered to be similar, e.g. based on matching of regular expressions.

For example "UpperLimit" and "MaxRange" may be considered to be likely equivalent.

A function $F(x)$ associates a value to an object x over a domain D, where the value may be not necessarily a truth value, but may be for example a numerical value or a sequence or a string or any other value of a given type.

The function needs to be well defined in the sense that given an object $x \in D$ the value $F(x)$ must be obtainable from x. Alternatively, the function may be constructed in order to return an undefined entity or equivalently to raise an exception whenever it is not properly possible to determine the value of $F(x)$.

A query may ask for example for objects in D that satisfy a given property expressed e.g. in terms of predicates and/or functions.

For example, a query may ask for all the elements in a domain D that satisfy a property P, requesting to determine some or all of the elements of the set $$\{x | x \in D \wedge P(x)\}$$

or alternatively of the set $$\{y | \exists_{x \in D}((y=x) \wedge P(x))\}$$

For example, $P(x)$ may be the predicate "x stores temperature measurements" and the query asks for all the locations/data identifiers and/or data sources in the domain D that store temperature data.

More generally, a predicate $P(x)$ may for example specify a sensor type/sensor model/sensor vendor and/or other property of the data stored at location x, like for example a data type, a data timestamp of the data stored at location x, a data range, etc.

For another example, $P(x)$ may be the predicate "x stores temperature measurements" and $F(x)$ may be a function returning a maximum value of the data stored at the location $x \in D$, assuming that F is actually defined for the location x.

A query may then for example also ask for one or more particular values, for example requesting to determine some or all the elements of the set $$\{| \exists_{x \in D}(P(X) \triangleq (F(x)=y))\}$$

containing a value y if and only if it exists an element x of the domain D satisfying a given property P and such that the value y actually is the value of a given function F evaluated for the element x.

Therefore, the set $\{y | \exists_{x \in D}(P(x) \wedge (F(x)=y))\}$ may for example contain all the maximum values of temperature measurements stored at some location in the domain D.

In the case that $F(x)$ may not be unique, the query may be formulated for example in terms of a relation $F(x,y)$, asking for some or all the elements of the set $$\{y | \exists_{x \in D}(P(x) \wedge (F(x,y)))\}$$

For example, $F(x,y)$ may indicate "the value y stored at x was measured during the time interval TIME INTERVAL".

The examples only exemplarily show how a query may be interpreted. More complex queries may arise as a variation of the shown examples.

For example, a query may ask for tuples, for example asking to determine some or all of the elements in the set $$\{(y,z) | \exists_{x \in D}(P(x) \wedge (x,y)) \wedge (G(x)=z))\}$$

or in the set $$\{(y,z) | \exists_{x \in D}(P(x) \wedge (F(x,y)) \wedge (G(x,z)))\}$$

For example, $G(x)$ may return a vendor of a sensor device used to get the data stored at the location x in D and therefore the tuples in the set $\{(y,z) | \exists_{x \in D}(P(x) \wedge (F(x,y)) \wedge (G(x)=z))\}$ may return as second component also said vendor. As a further example, $G(x,z)$ may evaluate to true if and only if "z is a vendor or a vendor code or a description or an identifier of the data stored at x".

As a special case FOO and/or $G(x)$ may be the identity function $id(x)=x$ that merely returns the location $x \in D$ itself and in such a case the query asks for the data location/data source/data identifier in addition or in alternative to the data, for example asking for some or all the elements in the set $\{(y,z) | \exists_{x \in D}(P(x) \wedge (F(x,y)) \wedge (id(x)=z))\}$.

Also for simplicity, a scalar y may be identified with a tuple containing only one component.

Queries may be extended to general n-ary properties and/or relations, for example asking for some or all the solutions in a solution set of the form $$\{((a,b, \dots) | \exists_{x,y, \dots \in D}(F(x,y, \dots, a,b, \dots))\}$$

Where again as special case the predicate F may contain expressions of e.g. the form $(id(x)=a)$.

In an object-oriented approach and/or in an information model, elements in the domain D may identify single objects/information models and values of member variables may be read out e.g. using predicates like e.g. "a is the value of MEMBER-ID of x". In this way objects and/or information models can be mapped to each other, ordinately reading out values that have analogous semantics and populating a target object/information model with said values, where said values may be the solutions in the solution set. In other words, based on the solutions in the solution set $$\{(a,b, \dots) | \exists_{x,y, \dots \in D}(F(x,y, \dots, a,b, \dots))\}$$

an object/information model with given characteristics can be obtained/created based on the tuples in the set that may read out members/variables of objects/information models of interest with given characteristics as queried.

An example of a query with a n-ary relation may be:

F(x,y,a,b)="x stores temperature data and y stores pressure data and a is the maximum value stored at x and b is the maximum value stored at y and the physical distance between the sensor that collected the data stored at x and the sensor that collected the data stored at y is less than DISTANCE".

The expression "the physical distance between the sensor that collected the data stored at x and the sensor that collected the data stored at y is less than DISTANCE" in the example forms a binary predicate which truth value is fixed by x and y.

A further constraint may be for example the additional binary predicate "the vendor of the sensor that collected the data stored at x is the same vendor of the sensor that collected the data stored at y".

Therefore, according to embodiments of the present disclosure a query may be formed in terms of at least one predicate F(x,y, . . . , a,b, . . . ) having predicate variables x,y, . . . , a,b, . . . at least in part defined over a domain D, the at least one predicate F identifying a solution set of tuples of values $\{(a,b, \ldots )|\exists_{x,y, \ldots \in D}(F(x,y, \ldots , a,b, \ldots ))\}$ such that for each tuple (a,b, . . . ) in the solution set of tuples of values $\{(a,b, \ldots )|\exists_{x,y, \ldots \in D}(F(x,y, \ldots , a,b, \ldots ))\}$ there exist values x,y, . . . $\in$D in the domain D such that the at least one predicate F evaluates to true for the existing values x,y, . . . $\in$D in the domain D and for the values a,b, . . . in the tuple (a,b, . . . ) in the solution set of tuples of values $\{(a,b, \ldots )|\exists_{x,y, \ldots \in D}(F(x,y, \ldots , a,b, \ldots ))\}$, wherein elements in the domain D uniquely allow to uniquely address and/or identify and/or retrieve stored data. The set of tuples of values $\{(a,b, \ldots )|\exists_{x,y, \ldots \in D}(F(x,y, \ldots , a,b, \ldots ))\}$ represents the desired information.

According to embodiments of the present disclosure therefore a machine-readable description of the at least one predicate F(x,y, . . . , a,b, . . . ) is received and at least some of the elements of the solution set of tuples of values $\{(a,b, \ldots )|\exists_{x,y, \ldots \in D}(F(x,y, \ldots , a,b, \ldots ))\}$, is obtained.

For elements in the solution set $\{(a,b, \ldots )|\exists_{x,y, \ldots \in D}(F(x,y, \ldots , a,b, \ldots ))\}$ an information model may be generated that stores/describes at least one tuple in said set, providing a consistent data structure for example within the OPC UA framework.

For example, the at least one predicate F(x,y, . . . , a,b, . . . ) may be expressed as conjunction and/or disjunction and/or negation of atomic unary, binary, . . . , n-ary predicates.

The atomic predicates may be mapped to an intermediate representation, allowing for example to translate equivalent predicates to a unique intermediate equivalent predicate.

An atomic predicate may not necessarily be free of logic operators, like e.g. AND, OR, NOT and forms therefore a data predicate and/or a predicate expressing a property related to the data.

Atomic predicates may be related to temperature (e.g. "x stores temperature data"), to measurement ranges, e.g. (e.g. "the upper value stored at x is a").

A predicate may be expressed with different formulations, that may be translated to an intermediate unique formulation. For example, "the upper measurement value stored at x is a" and "the upper range value stored at x is a" may both be translated to the same intermediate representation "the upper measurement value stored at x is a". Therefore both "upper measurement value" and "upper range value" are identified with "upper measurement value" in an intermediate representation. The atomic predicate mapping is done based on translation tables.

Therefore, according to embodiments of the present disclosure, the at least one predicate F(x,y, . . . , a,b, . . . ) obtained in machine-readable form is translated to a standardized/uniquely identified intermediate predicate $F_{int}$ (x,y, . . . , a,b, . . . ).

Depending on the structure of $F_{int}$ the set $\{(a,b, \ldots ) |\varepsilon_{x,y, \ldots \in D}(F(x,y, \ldots , a,b, \ldots ))\}$ is determined with different algorithms that take advantage of the structure of $F_{int}$, e.g. handling first atomic unary predicates in the expression of $F_{int}$.

Moreover, once the set $\{(a,b, \ldots )|\exists_{x,y, \ldots \in D}(F(x,y, \ldots , a,b, \ldots ))\}$ is determined different actions on elements in said set can be performed. For example, if the first component a of a tuple (a,b, . . . ) in said set identifies a memory location, a possible action is to read out the content of the memory location at regular intervals. For example, if the second component b of said tuple is a measurement value related to a measurement unit, a conversion to another value related to a different measurement unit may be performed, i.e. a conversion between units of measurement may be performed.

For example, for a temperature sensor an online-configured upper range value may be requested.

Then for example a unary predicate O(x) may express "x stores online-configured data" and a binary predicate U(x,y) may express "y is an upper range value stored at x".

The query may then ask to find some or all the elements of the set $$\{y|\exists_{x\in D}(O(x)\wedge U(x,y))\}$$

or some or all of the elements of the set $$\{(y,z)|\exists_{x\in D}(O(x)\wedge U(x,y)\wedge(z=x))\}$$

For this purpose, the O(x) may be mapped to the intermediate representation $O_{int}(x)$ and U(x,y) may be mapped to the intermediate representation $U_{int}(x,y)$.

In more complex queries $O_{int}(x)$ and $U_{int}(x,y)$ may themselves be formed by a plurality of queries connected together by logical connectives.

The query may be dissected in multiple partial expressions and for each partial expression a partial set of elements of D and/or a partial set of values may be determined such that based at least in part on said partial sets the original query can be solved and/or more conveniently solved.

A typical example may be the case when a predicate expresses lifecycle information, e.g. asking for an information like an upper measurement value "as ordered" or an upper information value "as build". In this case a parallel search can be carried out to search in different data sources based on the lifecycle information.

Parallel computations may be used in order to handle the partial expressions and/or partial sets efficiently.

For example, in order to determine $$\{y|\exists_{x\in D}(O_{int}(x)\wedge U_{int}(x,y))\}$$

it may be convenient to firstly determine those elements of D that satisfy $O_{int}$.

In fact, given that D is finite $D=\{d_1, \ldots , d_n\}$, evaluating $\exists_{x\in D}(O_{int}(x)\wedge U_{int}(x,y))$ is equivalent to evaluating $(O_{int}(d_1)\wedge U_{int}(d_1.y))\vee \ldots (O_{int}(d_n)\wedge U_{int}(d_n.y))$ and those elements of D that do not satisfy $O_{int}$ do not give a contribution to the set of solutions $\{y|\exists_{x\in D}(O_{int}(x)\wedge U_{int}(x,y))\}$ in the sense that, for d*$\in$D not satisfying $O_{int}$, the expression $(O_{int}(d^*)\wedge U_{int}(d^*,y))$ is certainly false and therefore the expression $(O_{int}(d_1)\wedge U_{int}(d_1.y))\vee \ldots (O_{int}(d_n)\wedge U_{int}(d_n.y))$ reduces to/is equivalent to $\exists_{x\in D'}(U_{int}(x,y))$ with $D'=\{x|x\in D\wedge O_{int}$ (x)} and therefore any solution y satisfying $\exists_{x\in D}(O_{int}(x) \wedge U_{int}(x,y))$ must satisfy also $\exists_{x\in D}(U_{int}(x,y))$ and therefore $$\{y|\exists_{x\in D}(O_{int}(x)\wedge U_{int}(x,y))\}=\{y|\exists_{x\in D}(U_{int}(x,y))\}$$

Determining $\{y|\exists_{x\in D}(U_{int}(x,y))\}$ is more convenient than determining the original set $\{y|\varepsilon_{x\in d}(O_{int}(x)\wedge U_{int}(x,y))\}$ given that D' may have much less elements than D.

In order to determine $\{y|\exists_{x\in D}(U_{int}(x,y))\}$ an iteration over D' may be carried out and for each element x of D' all the values y satisfying $U_{int}(x,y)$ are determined. The set of all the values determined in this way when iterating over D' forms the solution $\{y|\exists_{x\in D}(O_{int}(x)\wedge U_{int}(x,y))\}$, i.e. the single solutions are assembled together to obtain the solution to the query:

$$\{y \mid \exists_{x\in D} (O_{int}(x) \wedge U_{int}(x,\,y))\} = \bigcup_{x\in D'} \{y \mid U_{int}(x,\,y)\}$$

The described procedure only exemplarily shows how based on an original query, a dissection of the query may be carried out in order to obtain partial expression that allow to conveniently find some solutions that are subsequently assembled together in order to find all solutions of the original query.

More generally, when a solution of the form $U_{x\in D'}\{y|U_{int}(x,y)\}$ has to be obtained, the domain D' may be partitioned in disjunct blocks $D'_1, D'_2$, for example based on lifecycle information and then $$\bigcup_{x\in D'} \{y \mid U_{int}(x,\,y)\} = \bigcup_{x\in D'_1} \{y \mid U_{int}(x,\,y)\} \cup \bigcup_{x\in D'_2} \{y \mid U_{int}(x,\,y)\}$$

with the block $D'_1$ specifying for example information sources on a lifecycle "as ordered" and the block, $D'_2$ specifying for example information sources on a lifecycle "as built". The original query, e.g. "upper measurement value" can then be parallelized computing $U_{x\in D'_1}\{y|U_{int}(x,y)\}$ in parallel to $U_{x\in D'_2}\{y|U_{int}(x,y)\}$.

If for a given x in D there is exactly one y such that $U_{int}(x,y)$ the determination of the solution to the query may be particularly efficient, in particular if the value $U_{int}(x,y)$ can be simply read out.

The dissection may be also carried out for example firstly identifying D' querying $\{y|\exists_{x\in D}(O_{int}(x)\wedge(y=x))\}$ and then computing $\{y|\exists_{x\in D}(U_{int}(x,y))\}$. Therefore, a dissection may be interpreted as a dissection of an information demand into multiple partial queries based on dissection rules. The different queries may be sometimes executed in parallel efficiently.

In today's automation systems, information is typically pushed from devices and equipment. There is no notion of what information is required by the applications.

To support seamless data integration in dynamic scenarios such as situation-specific data analytics, the present disclosure describes a technical solution where information consumers such as data analytics applications or rather the data scientists can formulate their information needs and offload the procurement of this information to the automation system.

An information broker within the automation system processes these information needs together with the available information resources to manage the provisioning of the information accordingly.

This helps in reducing cost and calendar time for the data preparation phase in data analytics.

Automation systems are getting better at describing available information, most recently by introducing machine to machine (M2M) technologies like OPC UA and MQ telemetry transport (MQTT). MQTT. Using these technologies, the properties, conditions, capabilities, states, etc. of assets become digitally accessible and are described in great detail.

Atomic predicates P(x) of data stored at location x may be expressed in this way and be either stored together with the data stored at x and/or in a central or distributed database, relating the predicate P to the location x and/or vice versa such that P holds for x. Also, more complex, e.g. non-atomic predicates, may be stored similarly.

Therefore, more generally, a predicate P(x) of data stored at location x may be indicative of a data predicate that may not necessarily be an atomic predicate.

The challenge is that each application (information consumer) that wants to use the data, needs to find and understand the needed information source (information provider) on its own, e.g. by using search and discovery mechanisms. The entire domain D may be naively and inefficiently traversed when a query is formulated in order to search each location $x\in D$ for data satisfying P(x). This requires both network access to all data sources and an integration of each of their, typically heterogenous, information models. For example, for different location $x_1,x_2\varepsilon D$ equivalent predicates $P_1(x_1)$ and $P_2(x_2)$ may hold, the predicates $P_1,P_2$ being encoded/represented in a different way. For example, equivalent predicates $P_1,P_2$ may be encoded differently e.g. within different information models and/or with different encodings and/or labels. It is therefore necessary to discover the equivalence (or the absence of equivalence) between $P_1$ and $P_2$. This process is not fully automated currently, and human intervention and expertise is needed to identify the information of interest. As a result, significant time and effort is needed to bind applications to information sources. For example, significant time is needed to iterate over the domain D and/or to discover the equivalence between predicates $P_1,P_2$.

According to the present disclosure a likely equivalence can also be discovered, for example based on syntactic similarities between the representation of two predicates. For example regular expressions may be used to match strings that describe a similar path to a value, for example a Boolean value or a numerical value. Based on the similarities between the strings a likely equivalence between corresponding predicates may be detected.

Moreover, every application/human needs to solve the same problem again on its own, it creates added network load and opens security attack vectors with each client searching through all servers, and the discovered information models are typically too heterogenous to just "plug and use" except for core application like control.

Since the automation system has no way of knowing what information individual clients need, it is not possible to solve this task of fetching all data in an understandable format in an easily readable (single) location. This situation makes e.g. data analytics often economically unfeasible.

The present disclosure introduces an information broker, who receives requests from consumers in a defined language and uses this request to match it with the available resources and data in the automation system.

For example, the language may be used to express at least one predicate $\exists_{x,y,\dots\in D}(F(x,y,\dots,a,b,\dots))$ in machine-readable form, the predicate being then translated, if convenient, to a standardized/uniquely identified intermediate predicate $\exists_{x,y,\ldots \in D}(F_{int}(x,y,\ldots,a,b,\ldots))$. Elements $x,y,\ldots \in D$ in the domain D are then searched for which $F_{int}(x,y,\ldots,a,b,\ldots)$ is satisfiable and subsequently at least one solution $(a,b,\ldots)$ is returned that is an element of the set $\{(a,b,\ldots)|\exists_{x,y,\ldots \in ED}(F(x,y,\ldots,a,b,\ldots))\}$.

For example, an analytics client analyzes motor speed and temperature time series to assess the residual life of the motor. The application/data scientists describe the required data—i.e. the motor speed and temperature at a specific time resolution (x samples per time unit), which is required by this application to work properly. The information broker takes this request and looks at its data repositories to fulfill it. In the example, the motor is controlled by a drive. The drive measures the temperature of the motor. It does not measure the speed but can estimate it based on the control signals given. Thus, the information broker transmits this information to the client.

In another case, the motor might have a dedicated speed sensor. Then, the broker would use this superior information source to satisfy the client.

For example, a query may correspond to a formal description of the following predicate:

F(x,y,...,a,b,...):="x stores data about motor MOTOR and y stores data about motor MOTOR and x stores speed time series and y stores temperature time series and the time series resolution at x is at least TIMRES and the time series resolution at y is at least TIMERES and a is the time series stored at x and b is the time series stored at y".

Alternatively for example "a" may be the maximum of the time series stored at "x" and "b" the maximum of the time series stored at "y".

The predicate "y stores speed time series" may evaluate to true also in those cases where the speed time series is only indirectly obtained or obtainable, e.g. based on a history of given control signals to the motor. In this case when finding a value for the variable "a" in the predicate "a is the time series stored at x" the information broker is capable of computing/reconstructing the time series based on the history of control signals stored at x. The information broker then returns one or more elements in the solution set $\{(a,b,\ldots)|\exists_{x,y,\ldots \in D}(F(x,y,\ldots a,b,\ldots))\}$.

A language is provided to describe the information of interest at different levels of abstraction, e.g. describing which information is needed rather than specifying form which concrete information source it must be provided. The information sources are also augmented with extra semantic information, describing which information they offer. The information broker matches the requests of clients to the information provided.

For example, complex predicates F(x,y,...,a,b,...) can be expressed that are then internally reduced to an interconnection of simpler predicates, that can then be automatically handled by predefined algorithms.

For example a predicate "a is a speed time series of motor MOTOR with resolution at least TIMERES" may be internally translated to "(location x stores data about motor MOTOR) AND (x stores speed time series OR x stores history of control signals) AND (a is the time series stored at x OR a is the speed time series obtainable from the history of control signals stored at x) AND (the time series resolution at x is at least TIMERES OR the time series obtainable from the history of control signals stored at x has time series resolution at least TIMERES)". The information broker may then conveniently find a satisfying solution of said predicate, for example first finding locations storing data about motor MOTOR and only subsequently checking if the locations store speed time series or a history of control signals of the motor.

The information broker may evaluate the truth value of atomic predicates, e.g. of the predicate "location x stores data about motor MOTOR" based on augmented semantic information that is itself stored at the location x. Also more complex predicates may be evaluated analogously.

For example, x may be a node containing additional members to specify/describe semantic data about semantic information about the contents of x itself. Therefore dereferencing x it is possible to know that the data stored at x is for example data about motor MOTOR and that the data stored at x is e.g. temperature data".

The information broker may conversely use any convenient data structure and/or algorithm to find e.g. locations x satisfying a given predicate P(x). For this purpose the information broker may use/access databases, that may be local or distributed or remote and/or iterate over some or all the elements x∈D in the domain D in order to find the solutions satisfying the predicate P.

For example, for a given predicate P, accessing local or distributed databases and/or iterating over the domain D and/or traversing a graph reaching all nodes storing data, the information broker may compute some or all elements in the set $$\{x \in D | P(x)\}$$

Based on said computation, solutions satisfying more complex predicates can then be obtained, for example when evaluating $\exists_{x \in D}P(x) \wedge Q(x,a)$ for each x in D such that P, the information broker may compute some or all a satisfying Q(x,a).

An information demand (or consumer/provider-contract) is expressed in an explicit way using a dedicated language, which can be for example an OPC Unified Architecture (OPC UA) server information model or a list of needed information by terms of semantic identifiers. The information ban be, for example, about asset of interest such as asset IDs (e.g. serial numbers), asset types (e.g. a drive, or an ACS880 drive) and data items of interest (e.g. by semantic IDs).

The list of needed information may identify a list of predicates which may be connected together by logic conjunction/logic disjunction to obtain an overall query.

It is to be noted that information provider/consumer roles are independent of communication patterns like client/server, publisher/subscriber, request/response, etc. It is conceivable to also implement the consumer as a server offering its information needs to be satisfied through a client application.

There can be various strategies to handle consumer's requests. In case of an explicit request, there are different strategies to construct a consumer-suited information representation for the client. Firstly, it can be constructed an eager manner (eager provision). In this case, the information broker verifies that the requested data is available and constructs a consumer-accessible information source.

Due to a possibly huge amount of data in the information request, also a lightweight on-demand construction (lazy provision) strategy is possible. The broker maintains a list of proxy nodes for the application to query for needed data elements. The content itself is queried from the underlying data sources at the time of read request of the client.

The proxy nodes may be in particular used to discover some or all of the locations in $\{x \in D | P(x)\}$.

The locations in $\{x \in D | P(x)\}$ may be dereferenced and/or the content read-out only subsequently, for example to subsequently read out or determine (some or all) values a satisfying a predicate $Q(\tilde{x},a)$ for $\tilde{x} \in \{x \in D | P(x)\}$ in order to find solutions satisfying more complex predicates.

The downside of the lazy provision is lower ability to serve non-functional requirements as the data is fetched on demand.

The information broker may access one or more databases in order to relate a given predicate, e.g. a unary predicate $P(x)$, with one or more locations x in D satisfying P. The databases may form a distributed hierarchical database structure.

Following properties apply to the information consumer side: only stats the complete demand model; never knows the information source formats or model topologies; never queries any information source.

The data broker contains following information and an algorithm:

List of connected information sources from manual configuration or automatic discovery and has a set of pre-defined rules to classify those sources into various life-cycle phases (e.g. online data coming from OPC UA devices, or engineering data coming for engineering file artifacts). The list of connected information sources may identify the domain D and/or a partition of the domain D wherein each block of the partition is associated with a connected information source.

List of implementation-neutral intermediate terms (as intermediate language) that can be mapped between different technologies (e.g. "upper measurement range limit" as an intermediate language term). Terms of intermediate language are based on manual input of expert knowledge. Terms may also contain metadata for desired value representation, e.g., standard unit (e.g. ° C.) and data type (e.g. floating-point number with double precision). The intermediate terms allow to map e.g. technology specific predicates P to well-defined intermediate predicates $P_{int}$.

Technology-specific mappings from and to intermediate language terms. For example, "UpperRangeValue" in Aspect Object technology to "upper measurement range limit" as an intermediate term to "0112/2///61987 #ABA359" as semantic ID within OPC UA information models. Source and target language terms are coming from proprietary and open standards. Mappings from and to those come from codified expert knowledge. The technology-specific mapping M actually associates $P_{int}$ to the predicate P, i.e.

$$P \overset{M}{\to} P_{int}.$$

In the case where mappings via intermediate language are not readily available, direct mappings between demand and source side could be recommended to users via automated techniques comparing the structural, semantic and contextual information present in the data models of the source and demand sides. Mappings may not only contain equivalence from one technology to intermediate term, but also conversion of metadata, for example units. This conversion can be realized using text-replacement techniques e.g. regular expressions operating on textual serializations of technology-specific values. Therefore, the broker may be able to find/evaluate the equivalence between two predicates $P_1,P_2$ or at least to flag that the two predicates are likely equivalent.

Dissection rules: data broker contains a set of dissection rules to detect partial queries within the request. Those rules map sub-queries to data sources (for example online or offline group in the request of example 2 can be considered one sub-query).

Figure 2:
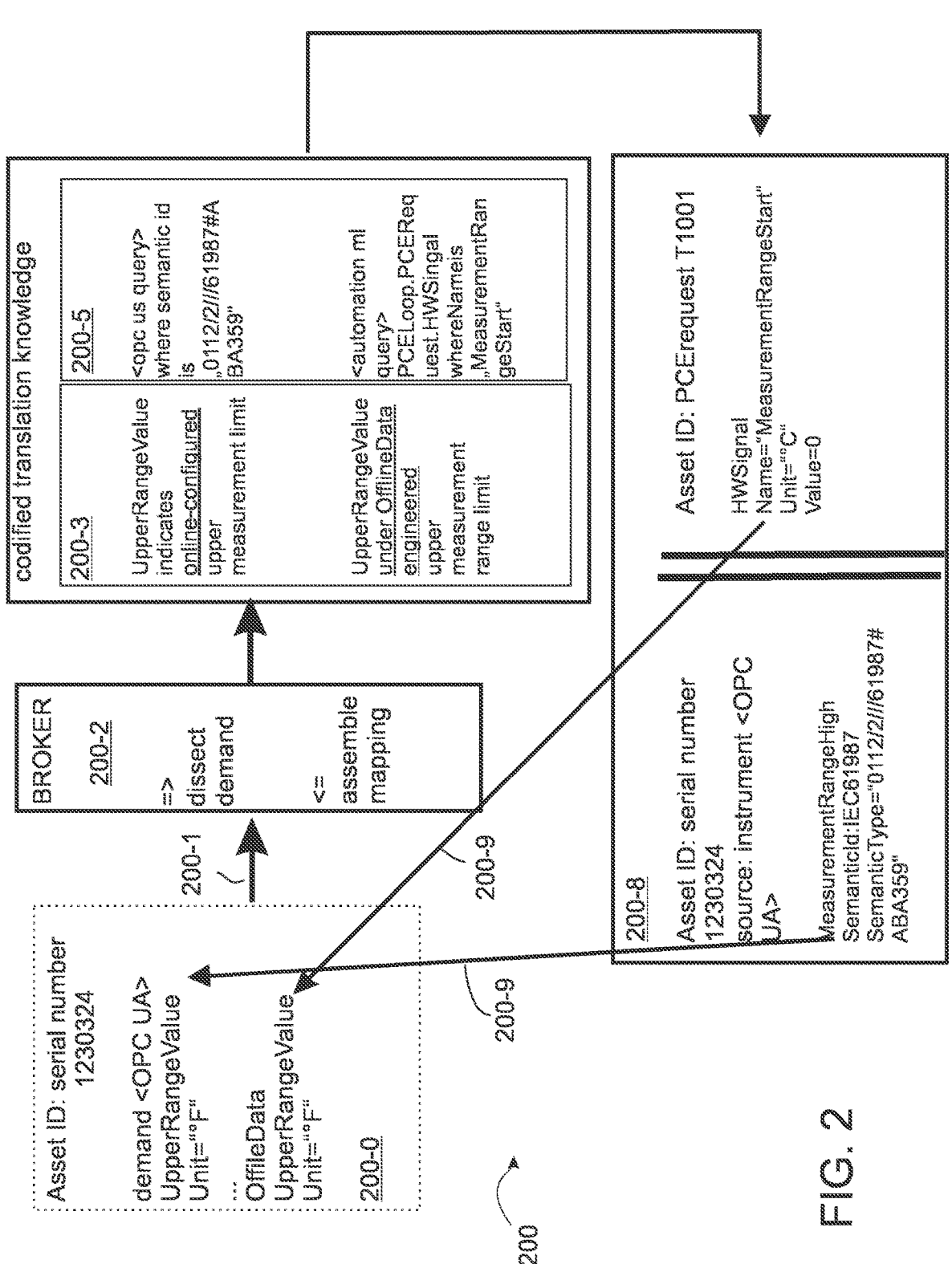
FIG. 2 shows an example of an application of a method for automatically supplying or locating data over a communication network according to the present disclosure.

In Example 2 the dissection happens based on lifecycle qualifiers "online" and "offline" data which are included in the query. In FIG. 2 "UpperRangeLimit" under Offline data object indicates the engineered upper limit for measured temperature; if this situation is found in the source, the knowledge for a corresponding AML query is called from the "translation knowledge".

For dissection and assembly, information about alternative asset/device ID in different data sources is needed, for example how to match device's serial number (1230324) from operational data source to its engineered role ID (T 1002) in AML file. Therefore, it is possible for example to identify a location x based on alternative IDs, e.g. "location x has serial number SERNUM" and/or "location x has role ID ROLEID" and also to consider in the queries predicates like "location x has serial number SERNUM and y is the role ID of location x".

The "identity mapping" for one asset for technology/lifecycle domains are contained in a dedicated table structure and are used by data broker to fetch data for the same asset from different data sources. For example the overall domain D may be partitioned in $D = D_{tech} \cup D_{life}$ wherein locations in $D_{tech}$ store technology information and locations in $D_{life}$ store life cycle information. If now two elements $x_1 \in D_{tech}$ and $x_2 \in D_{life}$ store information about the same asset/entity, e.g. where the predicate "x stored data of asset ASSET" is true for both $x_1,x_2$ then a convenient map between $x_1$ and $x_2$ allows to more easily find the elements in the domain D storing data about the asset ASSET without the need to iterate over all the elements of e.g. $D_{life}$ once $x_1 \in D_{tech}$ is found.

Subsequently the semantic mappings are used to find the corresponding entities with the same meaning in the found IDs. The semantic mapping may for example map equivalent predicates $P_1(x)$ and $P_2(x)$ with $P_1$ e.g. defined for elements of e.g. $D_{tech}$ and $P_2$ defined for elements of $D_{life}$.

Dissection and assembly algorithm: Data broker is able to dissect the information demand into multiple partial queries based on dissection rules (e.g. engineering or online data), such that different information sources can be queried in parallel. Results of partial queries are assembled to match the information demand expressed by data consumer. A complex predicate $\exists_{x,y,\ldots \in D}(F(x,y,\ldots,a,b,\ldots))$ may be dissected to obtain an interconnection of atomic predicates, e.g. of unary $P(x)$, binary $Q(x,a)$, . . . , n-ary atomic predicates connected by logic connectives, where the search for solutions can be handled by predefined algorithms and/or where the search for solutions can be parallelized.

Steps of this algorithm are generically listed illustrated in the two subsequent examples.

Following properties apply:

does not have to learn a fixed set of demands dissects the demand knows available data sources from manual configuration or discovery knows data source formats and model semantics based on proprietary or open technical standards derives individual queries based on built-in knowledge about source formats runs the queries on available data sources assembles the mapping of source data elements and model topology to the demand model elements and topology In the following the steps of the generic dissection and assembly algorithm executed by the broker are illustrated in detail:

0. existing data model of a condition monitoring aspect in the DCS specified for example as an information model or a snippet of an information model.

1. broker receives the model as "information demand" and is triggered to procure the data somehow. The model may directly or indirectly specify a predicate $\exists_{x,y,\ldots\in D}(F(x,y,\ldots,a,b,\ldots))$ that must be satisfied. For example if the model as information demand specifies an online-configured UpperRangeValue, F may be "x stores online-configured data and a is the upper range value of the data stored at x".

2. broker dissects and analyzes the demand for a. data model structure (e.g. parent-child relationships between structuring objects and data elements). For example given $x \in D$, finding a such that Q(x,a) holds may require the access of a data hierarchy to find or to compute values of a. Ans also iterating over elements in D may involve accessing hierarchical data structures in order to find all (relevant) elements in D.

b. semantics of individual data elements, e.g. variables. Here for example, for a given $x \in D$, those predicates P that hold for x may be found.

3. Data broker uses rule set (codified translation knowledge) to formulate demand fragments in intermediate language and subsequent queries matching model topology fragments on the demand. For example, an intermediate well-defined expression of a predicate may be obtained in terms of atomic unary, binary, . . . , n-ary predicates.

4. the available data sources (discovered on the network or explicitly given through a previous engineering step) are analyzed to know the protocols and data formats of the available sources. Therefore, for elements $x \in D$ and/or for a block of a partition of D the broker analyzes how to access x and/or the elements in the block of the partition.

5. for each demand fragment, the needed query fragment matching the selected source (protocol/type) is identified. For example, if a location x satisfying P(x) is found, the broker may identify a query fragment Q(x,y) matching the location x/the source storing x together with the appropriate protocol to identify, fetch or retrieve y.

6. generating and running concrete queries in the same or another format or standard for the data source a. a concrete query needs to combine static information like semantic IDs (part of translation knowledge) with case-specific information like the concrete data source identity(s) to be queried. For example, a query "x stores sensor data of sensor SENSORID" may include a sensor id SENSORID as case-specific information.

7. the query results are used to map the demand model to the source model(s) so that live data access can occur. This may include translating also the encoding of data (e.g. ° F. to ° C.) or changing metamodel (method call instead of variable write). When for example an element $x^* \in \{a | \exists_{x,y,\ldots\in D}(F(x,y,\ldots,a))\}$ locates some data of interest (e.g. when $x^* \in \{a | \exists_{x,y,\ldots\in D}(F(x,y,\ldots,a))\} = \{a | \exists_{x,y,\ldots\in D}(P(x,y) \wedge (a=y))\}$), then x* may be accessed/dereferenced in real time for present or future data access.

In the following more details are disclosed in two examples, Example 1 and Example 2 that exemplify the general concepts.

On the information source side new applications may adopt new languages/formalism such as OPC UA to describe the data that they provide. New formalisms include semantic IDs that are embedded into OPC UA information model of the field device. This setting is included in Example 1 below.

Multiple sources can be attached to the data to aggregate their information (one source might have data while the other does not, and overlapping data might be easier to translate from one of the sources than the other). In Example 2 below, two data sources are included: one for online (as-is configuration of a device) and one offline (as-engineered configuration) information.

On the information consumer side the Example 1 below shows a legacy application describing their demands in terms of legacy communication standards/APIs.

Example 2 shows a client describing its information demand as a single model or by stepwise browsing a model façade that that is built up on demand.

Example 1

Example 1 is illustrated by FIG. 1 and shows an example of an application of a method 100 for automatically supplying or locating data over a communication network according to the present disclosure.

Data source: OPC UA PA-DIM field device (e.g. temperature sensor) as data provider Data consumer: Legacy condition monitoring system requiring metadata along with the measurement value.

Scenario: As part of monitoring sensor de-calibration/ drifting, it relates actual measure temperatures in a known fluid with the entire measurement range (which can be narrow like between 10 and 20° C. or very wide like from 1 to 200° C.) this impacts what temperature changes are supposed to be normal over time and which ones are not. As example we take the UpperMeasurementLimit of a field device.

Following steps are executed in the system consisting of data source, data broker and data consumer.

1) Data consumer (possibly through a specific proxy suitable for a legacy application) provides 100-1 a demand requesting an "online-configured UpperRangeValue" in this example according to ABB's proprietary Aspect Object standard 100-0. Predicates that must hold are therefore "x stores temperature measurements AND x stores online-configured data AND y is the upper range value stored at x".

2) Data broker dissects 100-2 the request in a possibly multiple partial query based containing a life-cycle qualifier and a source-term. In this example, only one request is found in the request: Here "online-configured" is the life-cycle qualifier and "upper-measure-ment range limit" is the source-term. Aspect Object standard is the data consumer technology. Therefore the broker may search for/read out/compute those values y that satisfy the predicate "y is the upper range value stored at x" for any x matching the remaining query.

3) Data broker may translate 100-3 the request source-term into an intermediate language according to pre-defined rule sets ("UpperRangeValue" in AspectObject "Dialect" to "upper measurement range limit" in inter-mediate language). Therefore for a predicate (a=U(x)) with U denoting upper range, an intermediate representation is obtained (a=$U_{int}$(x))

4) Data broker scans the list of data sources to match the life-cycle qualifier ("online" data of the field device in this case), the broker also notes the implementation technology of the data source (OPC UA information model with PA DIM profile). Therefore the data broker finds those x satisfying "x stores online-configured data".

5) Data broker checks 100-5 for a needed "translation" from intermediate language to data source language (OPC UA information model). In this case the rule is to match "0112/2///61987 #ABA359" as semantic ID within the information source ("the semantic ID of the data stored at x is 0112/2///61987 #ABA359"). The broker therefore checks if given predicates holds for the actually considered data source/data location while searching for solutions in the domain D, and the check considers the particular data formats adopted by the considered data source/data location.

a. Absent relevant predefined rule sets, a combination of automated techniques could be used as part of a direct demand-to-source mapping recommendation. For instance, identification of synonyms "Upper Value" and "High Measurement" combined with structural infor-mation extraction on demand side: Root>DeviceSet>TTH300:DeviceType>ParameterSet: Folder>UpperRangeValue could result in a recom-mended mapping to a corresponding element on the source side: Root>DeviceSet>TTH300: DeviceType>ParameterSet: Folder>MeasurementRangeHigh (OPC UA). In this case the satisfying x may be found by the comparison of a path of x with a path specified in the query, e.g. also using matching with regular expressions. Formally: "the data stored at x is identified by a path PATH matching expression REGEXPR".

6) Unit conversion: not needed here

7) Metamodel conversion: not needed in this example

8) Query is assembled 100-8 and run on the matched source: trivial in this case due to one sub query 9) Query results are used to map 100-9 the demand model to the source model(s) so that live data access can occur. The satisfying solution(s) is(are) found.

Example 2

Example 2 is illustrated by FIG. 2 an shows an example of an application of a method 200 for automatically supplying or locating data over a communication net-work according to the present disclosure.

Data sources: Automation ML file for engineering data, OPC UA device with PA DIM information model for online data Data consumer: OPC UA client querying for both the online value (as is) and engineered value (as designed)

Scenario: during initial commissioning of a field device (e.g. temperature sensor in field), the plug and produce application needs to access the pre-configured (so called offline) device parameters (like upper range value) that are stored in file artifacts coming out from planning tools (in this example this is an Automa-tionML file). Those pre-configured parameters are compared to the actual parameters within the device (so called online parameters). During commissioning the plug and produce application may need to change online parameters to match offline data.

A query may for example be "x stores data of field device DEVICE AND y stores data of field device DEVICE AND x is pre-configured and y is online data AND a is the upper-range value stored at x and b is the upper-range value stored at y". A comparison between returned values for a and b may indicate if a change in the parameters is required, e.g. adjusting an upper-range value.

Following steps are executed in the system consisting of data source, data broker and data consumer:

1) Data consumer provides 200-1 a full information demand, e.g. expressed as a set of OPC UA read requests 200-0 to a "demand server" or an XML NodeSet file containing requested nodes.

a. Note that OPC UA and further technologies like web services do not currently provide means for client to state their data demand explicitly. Technically it pos-sible to formulate the demand by "expected" informa-tion model in at least two ways:

i. A set of queries to a "demand server" providing a catalogue of all possible data without having actual values. Each data may indicate a predicate that is requested to be true and/or a predicate variable indi-cating unknown values that must satisfy a specified predicate.

ii. Expressed in terms of an XML-serialized except of OPC UA information model

2) Data broker dissects 200-2 the requests into 2 partial queries based on the dissection rules. Here online and offline blocks are detected as subqueries. For example two subqueries may be "x is pre-configured" and "y is online".

a. Life-cycle qualifiers are matched to be online and offline data i.e. "online-configured" and "engineered" life-cycle qualifiers in terms of intermediate language. An intermediate representation for the predicates is obtained.

b. Note that in this example the "identity mapping" table is used to look up the engineering identity of the device with serial number (1230324) within the AML domain (T 1002). This is indicated by yellow labels in FIG. 2.

c. OPC UA is data consumer technology

3) Sub queries are translated 200-3 into intermediate term "upper measurement range limit" for both queries 4) Data broker locates AML file and OPC UA device as possible data sources a. Dissection rules are used here to match needed OPC UA device to an AML file 5) Broker queries 200-5 both sources:

a. For OPC UA device provider, the request in translated to "0112/2///61987 #ABA359" as semantic ID for OPC UA variable b. For AML file provider, the request is translated to semantic reference "NE 150 v1.0 Annex 3.3.7" which points to the "MeasurementRangeStart" attribute of corresponding "HWSignal" Interface of the AML vari-able.

c. In case of missing predefined mappings, structural information combined with semantic content analysis could be used towards recommending appropriate mappings as in the previous example.

6) Unit conversion:

a. E.g. ° C. to ° F. for the temperature transmitter (or liter/sec to qm/sec for a flow-meter)

7) Metamodel conversion:

a. E.g. mapping a read/write enable bit (Boolean) to an on method and an off method and a read-only status variable 8) Queries are assembled 200-8 and run on the matched sources (OPC UA and AML)

9) Query results are assembled back 200-9 to OPC UA reply, forming a model mapping between the demand and the source models for live data access According to the present disclosure query processing from any-technology to any-technology is supported. The demands can be described in any format and the underlying data sources can be in any format.

The present disclosure does not require a translation of the underlying data formats to an intermediate data format and queries do not need to be formulated in a common language.

The present disclosure is open-ended with different query languages as well as underlying data formats, to support legacy and new data sources and consumers. The architecture of the present disclosure is open-ended with new translators to transform incoming queries to underlying data format.

According to the present disclosure there is no need to know the source model structure and the semantics in the model to look for directly.

The present approach is able to cope with legacy applications without the need to change API of (possibly legacy) data source and data consumers.

An intermediate language for translation between demand and source side applications together with the added possibility for direct mapping recommendations may not require changes in the original application data models.

According to the present disclosure, not only syntactic, but also semantic and ID translations may be considered. The present disclosure not only establishes a way to read and write information from various information sources, but also provides means to identify the same data elements which are called differently, but have same semantics. In addition, according to the present disclosure, IDs can be translated to match the same asset in different information sources (e.g. one device may have one ID in the planning system and another ID during operations).

FIG. 3 illustrated details of a method for automatically supplying or locating data over a communication network according to methods of the present disclosure.

In one embodiment of the present disclosure, a method for automatically supplying or locating data (a,b, . . . ) 341 over a communication network is disclosed, the method comprising:

configuring 300 at least one data source to provide source data over the communication network, the source data being identified by at least one data identifier x 302 in a domain D 303. The identifier x may identify a variable, a node, a path, an uniform resource identifier such that data can be accessed dereferenced. The set of all possible identifiers forms the domain D.

receiving 310 a machine-readable description, the machine-readable description specifying at least one predicate $\exists_{x,y,\ldots \in D}(F(x,y,\ldots,a,b,\ldots))$ 311 that must be satisfied by the data;

labeling 320 data identified by the at least one data identifier x 302 with one or more labels at least in part indicative of data predicates (P(x), Q(x,y), R(x,a), . . . ) 321 that hold true for the data identified by the at least one data identifier x 302 or that are satisfiable for the data identified by the at least one data identifier x 302;

searching 330 for the data based at least in part on the machine-readable description and the labels;

obtaining 340 at least one solution (a,b, . . . ) 341 in a solution set $\{(a,b, \ldots) | \exists_{x,y,\ldots \in D}(F(x,y,\ldots, a,b, \ldots))\}$ 342 satisfying the at least one predicate $\exists_{x,y,\ldots \in D}(F(x,y,\ldots,a,b,\ldots))$ 311 based on the search;

supplying 350 the at least one solution (a,b, . . . ) over the communication network to a data consumer.

In some embodiments, the at least one solution (a,b, . . . ) comprises at least a data identifier x that allows to access data for reading and/or writing. For example, the at least one solution may be (x) returning an identifier x In some embodiments, the at least one predicate $\exists_{x,y,\ldots \in D}(F(x,y,\ldots,a,b,\ldots))$ is obtained based on an information model and/or where the at least one solution (a,b, . . . ) identifies an information model and/or where the data predicates P(x), Q(x,y), R(x,a), . . . are obtained from an information model, in particular an OPC UA information model.

For example based on the OPC UA information model, unary predicates like "x isVariable", "x isObject", "x isDeviceType" can be extracted and/or n-ary predicates like for example "x organizes A, B" "x has TypeReference C, D", etc.

In some embodiments, the predicate $\exists_{x,y,\ldots \in D}(F(x,y,\ldots,a,b,\ldots))$ and/or the data predicates P(x), Q(x,y), R(x,a), . . . are be expressed with an expression that is then translated to intermediate representations of the predicates based on translation rules, for example where the predicates can be expressed based on an information model.

In some embodiments, equivalence between predicates or likely equivalence between predicates is automatically detected, in particular for automatically obtaining a recommended intermediate representation of the predicates.

The equivalence may be detected based on equivalence tables, ontologies, mappings, e.g. mapping both "meter" and "feet" to "x is Length".

In some embodiments, the equivalence or likely equivalence between predicates is determined based on syntactic or semantic characteristics, in particular on strings matching regular expressions.

For example, some word or text similarity algorithms like Levenshtein similarity or token based similarity algorithms may be used after text stemming.

Those algorithms can either be applied on the "names" of the predicates or on human-readable descriptions of the predicates, those descriptions can, for instance, be extracted from IEC 61360 term descriptions found in eclass or CDD.

In some embodiments, the search is a parallel distributed search and the data identifier identifies a path in a graph to a node storing the identified data.

Some embodiments relate to a system for automatically supplying or locating data over a communication network, the system comprising:

at least one data source configured to provide source data over the communication network, the source data being identified by at least one data identifier x in a domain D.

a first subsystem configured to receive a machine-readable description, the machine-readable description specifying at least one predicate that must be satisfied by the data;

a second subsystem configured to label the data identified by the at least one data identifier x with one or more labels at least in part indicative of data predicates that hold true for the data identified by the at least one data identifier x or that are satisfiable for the data identified by the at least one data identifier;

a third subsystem configured to search for the data based at least in part on the machine-readable description and the labels;

a fourth subsystem configured to obtain at least one solution in a solution set satisfying the at least one predicate based on the search;

the system being configured to supply the at least one solution over the communication network to a data consumer.

In some embodiments, the at least one predicate is obtained based on an information model and/or where the at least one solution identifies an information model and/or where the data predicates are obtained from an information model, in particular an OPC UA information model.

In some embodiments, the predicates and/or the data predicates are expressed with an expression that is then translated to intermediate representations of the predicates based on translation rules, for example where the predicates can be expressed based on an information model.

In some embodiments, equivalence between predicates or likely equivalence between predicates is automatically detected, in particular for automatically obtaining a recommended intermediate representation of the predicates.

In some embodiments, the equivalence or likely equivalence between predicates is determined based on syntactic or semantic characteristics, in particular on strings matching regular expressions.

In some embodiments, a third subsystem configured to search for the data performs a parallel distributed search and the at least one data identifier identifies a path in a graph to a node storing the identified data.

In some embodiments, the at least one solution comprises at least a data identifier that allows to access data for reading and/or writing.

Methods and systems of the present disclosure allow to efficiently and automatically find information on a distributed system satisfying given requirements.

For example, the information broker may use one or more database to find/retrieve locations x in D satisfying a given predicate, e.g. P(x). In this way iterations over the domain D may be reduced and overall network traffic may be reduced, e.g. reducing the iterations over the domain D in order to locate/find/retrieve the required information.

Together with the reduction of network traffic, the time required to locate the information is also reduced and an error rate in retrieving the information is also reduced due to the automation of the information finding and retrieval.

The invention claimed is:

1. A method for automatically supplying or locating data over a communication network, the method comprising:

configuring, by a system, at least one data source comprising a field device to provide source data over the communication network, the source data being identified by at least one data identifier in a domain of identifiers, wherein the at least one data identifier comprises one or more memory locations;

receiving, by a first subsystem of the system, a machine-readable description, the machine-readable description specifying at least one predicate that must be satisfied by the source data, wherein the at least one predicate provides semantical information about the source data, wherein the at least one predicate comprises one or more binary or n-ary predicates with a truth value fixed by pairs or tuples;

labeling, by a second subsystem of the system, the source data identified by the at least one data identifier with one or more labels indicative of data predicates that hold true for the source data identified by the at least one data identifier or that are satisfiable for the source data identified by the at least one data identifier;

searching, by a third subsystem of the system, for the source data based on the machine-readable description and the labels;

obtaining, by a fourth subsystem of the system, at least one solution in a solution set satisfying the at least one predicate based on the search; and supplying, by the system, the at least one solution over the communication network to a data consumer, wherein the at least one solution comprises access to at least one of the one or more memory locations over the communication network;

wherein the at least one predicate is obtained based on an information model.

2. The method of claim 1, wherein the at least one solution comprises at least a data identifier that allows access to the source data for at least one of reading and writing.

3. The method of claim 1, wherein the at least one solution identifies an information model or where the data predicates are obtained from an information model.

4. The method of claim 3, wherein the information model is an OPC UA information model from which predicates are extracted.

5. The method of claim 1, wherein the at least one predicate or the data predicates are expressed with an expression that is then translated to intermediate representations of the predicates based on translation rules.

6. The method of claim 5, wherein the predicates are expressed based on an information model.

7. The method of claim 1, wherein equivalence between predicates or likely equivalence between predicates is automatically detected.

8. The method of claim 7, wherein the equivalence or likely equivalence between predicates is determined based on syntactic or semantic characteristics.

9. The method of claim 8, wherein the equivalence between predicates is determined based on strings matching regular expressions.

10. The method of claim 1, wherein the search is a parallel distributed search and the data identifier identifies a path in a graph to a node storing the identified source data.

* * * * *